2,847,425

18-OXYGENATED-Δ⁴-ETIOCHOLENE-17β-CAR-BOXYLIC ACID DERIVATIVES

Norman G. Brink, Westfield, Edward A. Ham, Clark, Robert E. Harman, Avenel, and Lewis H. Sarett, Princeton, N. J., assignors to Merck & Co., Inc., Rahway, N. J., a corporation of New Jersey No Drawing. Original application October 13, 1954, Serial No. 462,098. Divided and this application November 30, 1955, Serial No. 550,179

8 Claims. (Cl. 260—397.1)

This application is a division of our copending application Serial No. 462,098, filed October 13, 1954.

This invention relates to derivatives of Δ⁴-etiocholenic acid and particularly to 18-oxygenated-Δ⁴-etiocholene-17β-carboxylic acid derivatives and to processes for preparing these compounds.

The 18-oxygenated-etiocholene-17β-carboxylic acid derivatives which are the subject of the invention have the following general formula:

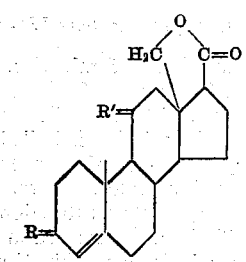

wherein R and R' are carbonyl or hydroxyl groups and can be the same or different groups. These compounds are useful in the preparation of 11-dehydrocorticosterone, Kendall's compound A, an adrenocortical hormone of use in clinical treatment of disorders resulting from loss of adrenal function. As an example of this, the 18,20-lactone of Δ⁴-3,11-dioxo-18-hydroxy-etiocholene-17β-carboxylic acid can be reacted with hydrazine to open the lactone ring thereby forming the corresponding hydrazide which on treatment with an excess of methane sulfonyl chloride and then desulfurization with deactivated Raney nickel is converted to Δ⁴-3,11-dioxo-etiocholene-17β-carboxylic acid. The further conversion of the latter compound to Kendall's compound A acetate can be effected by the classical diazoketone synthesis involving treatment of the diketo acid with oxalyl chloride followed by reaction of the acid chloride with diazomethane and acetic acid. These reactions may be chemically represented as follows:

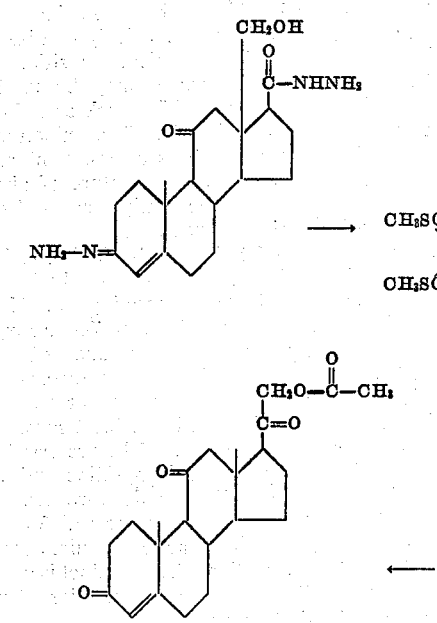
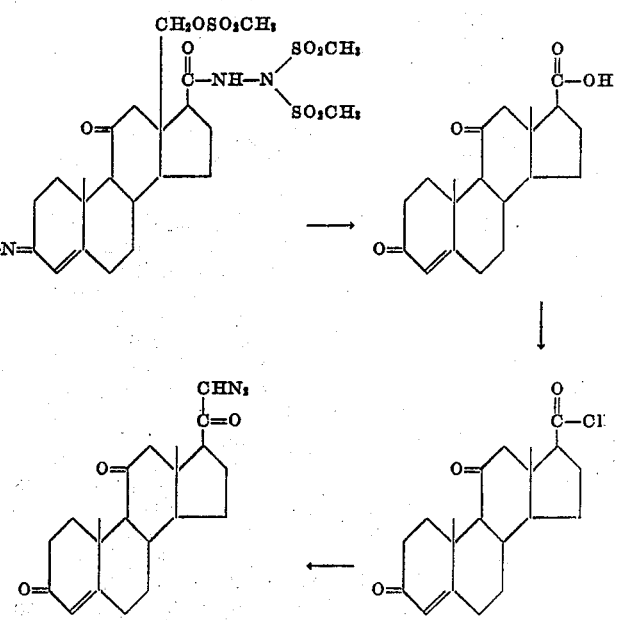

The compounds of the invention are prepared by reacting the 18,20-lactone of Δ⁴-3-oxo-18-hydroxy-11β,18-epoxyetiocholene-17β-carboxylic acid (compound I) with a base to form Δ⁴-3,18-dioxo-11β-hydroxyetiocholene-17β-carboxylic acid (compound II) which is reduced with an alkali metal borohydride to form Δ⁴-3,11β,18-trihydroxyetiocholene-17β-carboxylic acid (compound III). The latter compound is converted to the 18,20-lactone of Δ⁴ - 3,11β,18 - trihydroxyetiocholene - 17β - carboxylic acid (compound IV) by heating. The 18,20-lactone is then oxidized at the 3-position to form the corresponding 18,20-lactone of Δ⁴-3-oxo-11β,18-dihydroxyetiocholene-17β-carboxylic acid (compound V) which is further oxidized to form the 18,20-lactone of Δ⁴-3,11-dioxo-18-hydroxyetiocholene-17β-carboxylic acid (compound VI). These reactions can be chemically represented as follows:

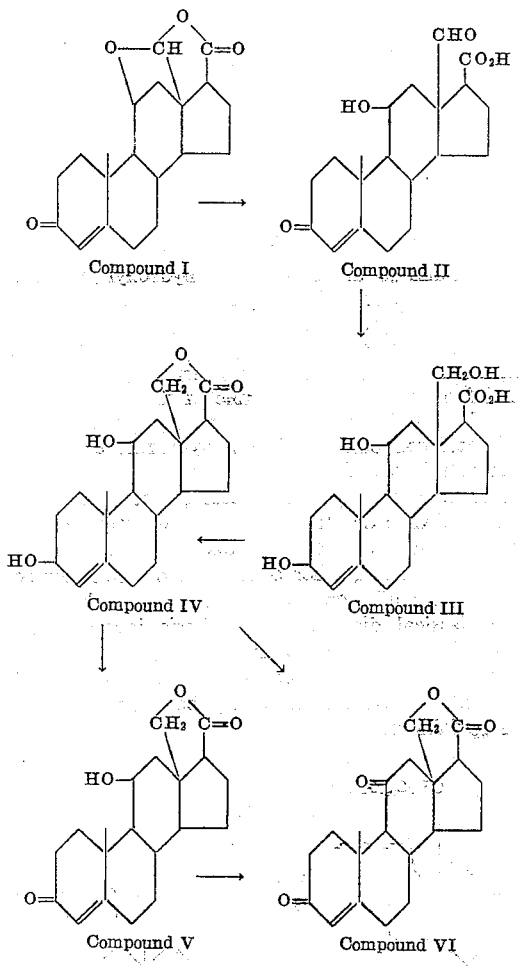

The 18,20-lactone of Δ⁴-3-oxo-18-hydroxy-11β,18-epoxyetiocholene-17β-carboxylic acid is reacted with a base to form Δ⁴-3,18-dioxo-11β-hydroxetiocholene-17β-carboxylic acid. Any of the conventional bases can be used, such as aqueous solutions of alkali or alkaline earth metal hydroxides, carbonates, bicarbonates, or alkoxides, although it is preferred to use alcoholic solutions of alkali metal hydroxides. Typical examples of suitable bases are sodium hydroxide, potassium hydroxide, sodium carbonate, potassium bicarbonate, sodium methoxide, and potassium ethoxide. The reaction is carried out at approximately 0 to 100° C. with 85 to 100° C. being preferred. The reaction is usually completed in a few minutes to a half hour although, with certain of the reactants the reaction time is extended to a few days. The reaction may be carried out in any of the usual organic solvents, such as alcohols, although it is necessary to have a small amount of water present. The product is recovered from the reaction mixture by acidifying the extracting with an immiscible organic solvent, such as ethyl acetate.

The Δ⁴-3,18-dioxo-11β-hydroxyetiocholene-17β-carboxylic acid is reduced by reaction with an alkali metal borohydride to form Δ⁴-3,11β,18-trihydroxyetiocholene-17β-carboxylic acid. The reaction can be carried out in a solvent, such as water, methanol, ethanol or tetrahydrofuran. It is desirable to add a small amount of a base to aid in solubilizing the steroid. The temperature of the reaction may vary from about 40 to 100° C., but is preferably from 90 to 100° C. The reaction usually requires from one to three hours for completion, although longer or shorter periods may be used. The alkali metal borohydride, which is preferably used in excess of the equimolar amount, is a boron compound having an alkali metal associated with a group consisting of a boron atom and at least one and up to four reactive hydrogen atoms. When there are less than four hydrogen atoms, the group containing the boron atom may contain one to three atoms other than hydrogen or one to three radicals, which atoms or radicals are relatively inert and non-reactive with respect to the reducing action characteristic of the hydrogen atoms of these compounds, or a combination of such atoms other than hydrogen and radicals so long as at least one hydrogen atom is present and so long as the total number of atoms including hydrogen and radicals is four. Typical examples of these compounds are sodium borohydride, lithium borohydride, sodium triethylborohydride and potassium borohydride. The product can be recovered from the reaction mixture by acidifying and extracting with an immiscible solvent, such as ether, chloroform, ethylene chloride or ethyl acetate.

The Δ⁴-3,11β,18-trihydroxyetiocholene-17β-carboxylic acid is heated to form the corresponding 18,20-lactone. The heating is preferably carried out at approximately 200° C. although higher or lower temperatures can be used, such as from 100 to 300° C. The heating can be carried out in a high boiling unreactive solvent, such as diphenylether. The reaction is preferably carried out in vacuo or in a nitrogen atmosphere. The reaction proceeds rapidly usually requiring only one to fifteen minutes for completion. The product containing only unreacted acid is conveniently purified by partitioning between ethyl acetate and aqueous sodium bicarbonate.

The 18,20-lactone of Δ⁴-3,11β,18-trihydroxyetiocholene-17β-carboxylic acid is converted to the corresponding 3-oxo-11-hydroxy lactone by oxidation. The reaction is conveniently effected with manganese dioxide at room temperature (25–30° C.). Other oxidizing agents can, however, be used which will selectively oxidize the three position without affecting the eleven position. Typical examples of such agents which may be used are N-bromoamides and N-bromoimides, such as N-bromoacetamide and N-bromosuccinimide. The oxidation may be carried out in a solvent, such as acetone, chloroform, or the like and preferably at a temperature of about 20 to 40° C. The product is conveniently recovered by extraction with an immiscible solvent.

The 18,20-lactone of Δ⁴-3,11β,18-trihydroxyetiocholene-17β-carboxylic acid and the 3-oxo-11-hydroxy-lactone can be oxidized to the corresponding 18,20-lactone of Δ⁴-3,11-dioxo-18-hydroxyetiocholene-17β-carboxylic acid. The oxidizing agent can be compounds of hexavalent chromium, such as chromic acid or chromyl chloride, chromium trioxide and also permanganates. The reaction is preferably carried out in an inert solvent, such as pyridine, acetic acid or benzene. The preferred oxidizing agents are chromium trioxide in pyridine and chromium trioxide in acetic acid. The reaction proceeds favorably at 0 to 40° C. with room temperature (25–30° C.) being the most convenient. The reaction requires from one to twenty hours for completion. The product is conveniently recovered by adding water to the reaction mixture and extracting with ethyl acetate.

The following examples are given for purposes of illustration:

EXAMPLE 1

Δ⁴-3,18-dioxo-11β-hydroxyetiocholene-17β-carboxylic acid

Sodium hydroxy solution (2.5 ml. of 2.5 N) is added to 5.2 mg. of the 18,20-lactone of Δ⁴-3-oxo-18-hydroxy-11β,18-epoxyetiocholene-17β-carboxylic acid in 2.5 ml. of warm methanol. The solution is boiled on the steam cone for five minutes with loss of most of the methanol and appearance of a yellow color. A trace of crystalline solid is obtained by ethyl acetate extraction of the cooled alkaline solution. Ethyl acetate extraction after acidification followed by decolorization with Norit in acetone gives 5.1 mg. of nearly colorless granular crystals of Δ⁴-3,18-dioxo-11β-hydroxyetiocholene-17β-carboxylic acid $\lambda_{Max.}^{Nujol}$ 2.9, 3.2, 5.77, 6.00 and 6.18μ

The transparent cubes become opaque at ca. 200° C. on the micro hot-stage and slow transition to flat blades is observed at ca. 220° C.; melting with discoloration occurs at 285 to 300° C.

EXAMPLE 2

Δ⁴-3,11β,18-trihydroxyetiocholene-17β-carboxylic acid

Sodium borohydride (15 mg.) is added to 6.4 mg. of Δ⁴-3,11β,18-trihydroxyetiocholene-17β-carboxylic acid in 1 ml. of 0.05 N sodium hydroxide solution, and the reaction mixture heated on the steam cone (100° C.) for 1.5 hours. Ethyl acetate extraction after acidification to pH 2 gives 6.0 mg. of amorphous white solid trihydroxy acid (2), $\lambda_{max.}^{Nujol}$ 2.9–3.1 and 5.73–5.85μ

EXAMPLE 3

18,20-lactone of Δ⁴-3,11β,18-trihydroxyetiocholene-17β-carboxylic acid

A 6.0 mg. sample of the 18,20-lactone of Δ⁴-3,11β,18-trihydroxyetiocholene-17β-carboxylic acid is heated in vacuo at 195–205° C. for ten minutes in a micro sublimation apparatus; a trace of sublimate is discarded and the non-volatile residue partitioned between ethyl acetate and aqueous sodium bicarbonate to yield four mg. of dihydroxylactone (3) as a colorless neutral gum, $\lambda_{Max.}^{CHCl_3}$ 2.9 and 5.72μ

EXAMPLE 4

18,20-lactone of Δ⁴-3-oxo-11,18-dihydroxyetiocholene-17β-carboxylic acid

The 18,20-lactone of Δ⁴-3,11β,18-trihydroxyetiocholene-17β-carboxylic acid (4 mg.) is dissolved in acetone and manganese dioxide (10 mg.) is added. The mixture is stirred at room temperature for one and a half hours. The manganese dioxide is filtered off and the solvent removed by subjecting the mixture to distillation in vacuo.

EXAMPLE 5

18,20-lactone of Δ⁴-3,11-dioxo-18-hydroxyetiocholene-17β-carboxylic acid

The 18,20-lactone of Δ⁴-3,11β,18-trihydroxyetiocholene-17β-carboxylic acid (4 mg.) in solution in 0.1 ml. of pyridine is added to the complex form 11 mg. of chromium trioxide and 0.2 ml. of pyridine and the mixture kept overnight at 28° C. The reaction mixture, which contains much dark solid, is then brought to pH 4 with hydrochloric acid and extracted with ethyl acetate. An ethyl acetate solution of the amber residue is passed through a short column of Norit to yield 3.0 mg. of granular crystalline diketo-lactone (4). This compound softens at 211° C. and melts at 230–237° C., $\lambda_{Max.}^{Nujol}$ 5.69, 5.89, 6.00 and 6.18μ

Any departure from the above description which conforms to the present invention is intended to be included within the scope of the claims.

What is claimed is:
1. Δ⁴-3,18-dioxo-11β-hydroxyetiocholene - 17β - carboxylic acid.
2. Δ⁴-3,11β,18 - trihydroxyetiocholene - 17β - carboxylic acid.
3. A process which comprises reacting the 18,20-lactone of Δ⁴-3-oxo-18-hydroxy-11β,18-epoxyetiocholene-17β-carboxylic acid with a base to form Δ⁴-3,18-dioxo-11β-hydroxyetiocholene-17β-carboxylic acid.
4. A process which comprises reacting Δ⁴-3,18-dioxo-11β-hydroxyetiocholene-17β-carboxylic acid with an alkali metal borohydride to form Δ⁴-3,11β,18-trihydroxyetiocholene-17β-carboxylic acid.
5. A process which comprises reacting the 18,20-lactone of Δ⁴-3-oxo-18-hydroxy-11β,18-epoxyetiocholene-17β-carboxylic acid with an alcoholic solution of an alkali metal hydroxide to produce Δ⁴-3,18-dioxo-11β-hydroxyetiocholene-17β-carboxylic acid.
6. The process of claim 5, wherein the reaction is carried out at a temperature of 0 to 100° C.
7. A process which comprises reacting Δ⁴-3,18-dioxo-11β-hydroxyetiocholene-17β-carboxylic acid with an alkali metal borohydride at a temperature of about 40 to 100° C. to produce Δ⁴-3,11β,18-trihydroxyetiocholene-17β-carboxylic acid.
8. A compound selected from the class consisting of Δ⁴-3,18-dioxo - 11β - hydroxyetiocholene - 17β - carboxylic acid, and Δ⁴-3,11β,18-trihydroxyetiocholene-17β-carboxylic acid.

References Cited in the file of this patent

UNITED STATES PATENTS 2,705,712    Cella                 Apr. 5, 1955

OTHER REFERENCES

Simpson: Helv. Chim. Acta, vol. 37 (1954), pp. 1200–1223.

Notice of Adverse Decision in Interference

In Interference No. 91,204 involving Patent No. 2,847,425, N. G. Brink, E. A. Ham, R. E. Harman, and L. H. Sarett, 18-Oxygenated-$\Delta^4$-etiocholene-17$\beta$-carboxylic acid derivatives, final judgment adverse to the patentees was rendered Feb. 20, 1964, as to claim 1.

[*Official Gazette August 25, 1964.*]